(No Model.)
J. A. DUBBS.
MANUFACTURE OF ASPHALTUM.
No. 480,235. Patented Aug. 2, 1892.
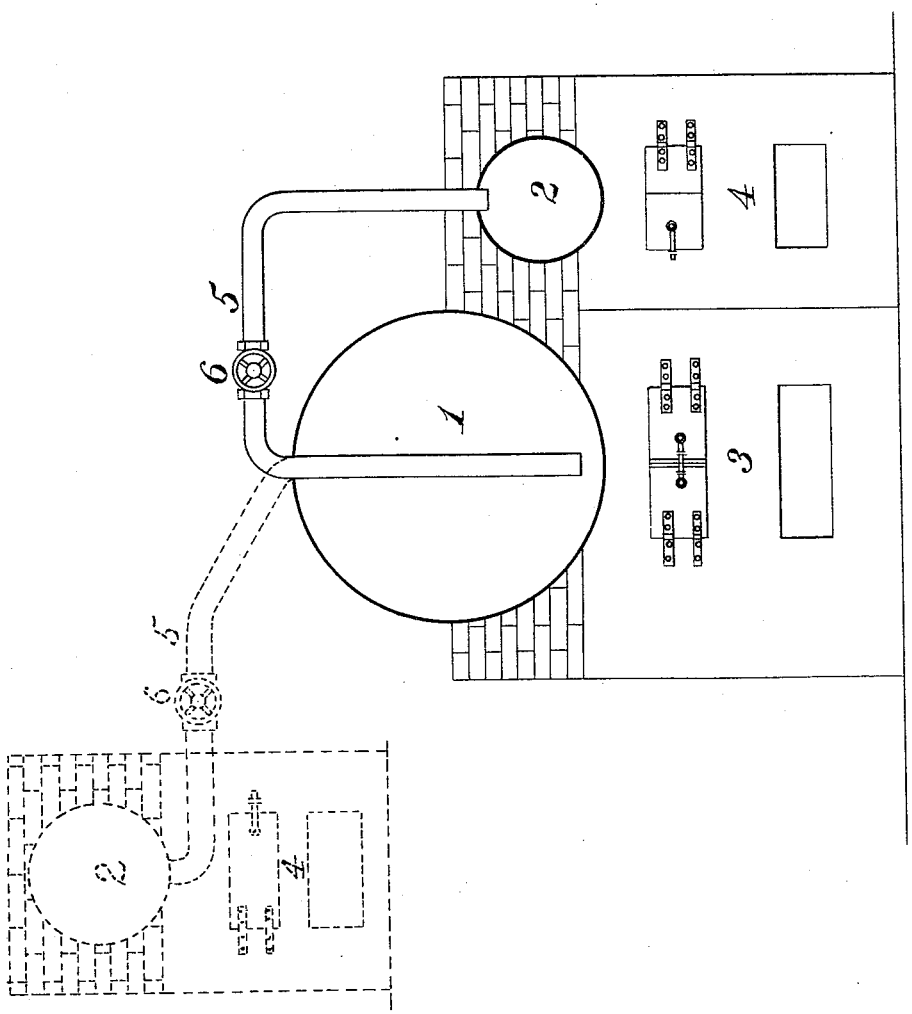
WITNESSES:
Darwin S. Wolcott
F. E. Gaither
INVENTOR,
Jesse A. Dubbs,
by George H. Christy
Att'y.

ically combined therewith, substantially as set forth.

UNITED STATES PATENT OFFICE.

JESSE A. DUBBS, OF ALLEGHENY, ASSIGNOR OF ONE-HALF TO JAMES H. WHITE, OF PITTSBURG, PENNSYLVANIA.

MANUFACTURE OF ASPHALTUM.

SPECIFICATION forming part of Letters Patent No. 480,235, dated August 2, 1892.

Application filed July 27, 1891. Serial No. 400,862. (No specimens.)

*To all whom it may concern:*

Be it known that I, JESSE A. DUBBS, a citizen of the United States, residing at Allegheny, in the county of Allegheny and State of Pennsylvania, have invented or discovered certain new and useful Improvements in the Manufacture of Asphaltum, of which improvements the following is a specification.

In applications filed October 11, 1890, and July 10, 1891, and serially numbered 367,833 and 399,020, respectively, I have described and claimed certain processes for the manufacture of asphaltum, said processes consisting, generally stated, in adding sulphur in a solid condition to crude petroleum or residuum thereof and subjecting the mixture to sufficient heat to effect the chemical combination of the two ingredients.

The invention described herein relates to certain improvements in said processes, whereby the chemical combination of the sulphur and petroleum may be effected more rapidly and thoroughly.

The invention is hereinafter more fully described and claimed.

In the accompanying drawing, forming a part of this specification, is shown in elevation a form of plant applicable for the practice of my invention, a modification of the plant being indicated by dotted lines.

As shown in the drawing, the plant consists of a still 1 and a retort 2, in which the sulphur is charged, the retort and still being arranged over suitable furnaces 3 and 4 and connected by a pipe 5, the latter extending down into the still to a point near the bottom thereof.

In the practice of my invention I charge into the still 1 crude petroleum or a residuum of the distillation thereof, as tar, cylinder-stock, &c., and heat the same to a temperature a little below that required for distilling such material. Sulphur is charged into the retort 2 and subjected to a sufficient heat to melt or vaporize it, dependent upon the condition in which it is to be charged into the still. When the sulphur is to be added to the oil or residuum in a vaporous condition, the arrangement of retort shown in full lines is employed; but if the sulphur is to be added in a liquid condition the retort should be elevated sufficiently with relation to the still to allow the molten sulphur to flow easily into the still. As soon as the material in the still has been heated to a proper temperature and the sulphur is in the desired fluid condition the valve 6 in the pipe connecting the retort and still is opened and the sulphur allowed to flow into the latter. The fluid sulphur should be discharged into material in the still below the surface thereof and preferably near the bottom of the still, so as to effect a rapid and thorough dissemination of the sulphur through the crude petroleum or residuum. The sulphur may be allowed to flow into the still continuously or intermittently, as desired, the temperature of the charge in the still being maintained at a point a little below that necessary to effect a distillation of the crude petroleum or residuum. The heat in the still is maintained and the addition of fluid sulphur is continued until the charge in the still has attained the required degree of hardness, which may be ascertained by drawing off small quantities as samples and allowing them to cool. This method of adding the sulphur permits of the better regulation of the quantities to be added, and also effects a more rapid and thorough dissemination of the sulphur through the charge, thereby facilitating the chemical combination of the two ingredients.

As is well known, sulphur is of less specific gravity than the petroleum residuum, and will therefore remain on top of the residuum in the still when charged thereinto in a solid condition until it is stirred in, and, further, it is desirable that the sulphur should be in an anhydrous condition when charged into the residuum, as the presence of moisture delays the chemical combination.

By adding the sulphur in the manner described—*i. e.*, in a fluid state—an anhydrous condition thereof is insured, and as the fluid sulphur is discharged below the surface of the residuum, which is in a state of ebullition, it is rapidly and thoroughly disseminated throughout the residuum, thereby facilitating the chemical combination of the two materials.

I claim herein as my invention—

1. As an improvement in the art of manufacturing asphaltum, the method herein described, which consists in heating crude petroleum or residuum thereof, charging fluid sulphur therein, and maintaining the heat of the charge until the desired combination has been effected, substantially as set forth.

2. As an improvement in the art of manufacturing asphaltum, the method herein described, which consists in heating crude petroleum or residuum thereof, charging vaporous sulphur therein, and maintaining the heat of the charge until the desired combination has been effected, substantially as set forth.

In testimony whereof I have hereunto set my hand.

JESSE A. DUBBS.

Witnesses:
W. B. CORWIN,
DARWIN S. WOLCOTT.